United States Patent [19]

Nishimura et al.

[11] 4,411,470

[45] Oct. 25, 1983

[54] SUPPORTING DEVICE OF A HEAD REST FOR A VEHICLE SEAT

[75] Inventors: Shinichi Nishimura, Zama; Yoshinori Akiyama; Yoshiaki Hoshika, both of Yokohama, all of Japan

[73] Assignee: Nissan Motor Co., Ltd., Yokohama, Japan

[21] Appl. No.: 208,381

[22] Filed: Nov. 19, 1980

[30] Foreign Application Priority Data

Nov. 21, 1979 [JP] Japan ............................. 54-150940

[51] Int. Cl.³ .............................................. A47C 1/02
[52] U.S. Cl. ................................... 297/410; 248/412
[58] Field of Search ............... 248/412, 411; 403/109, 403/110, 52; 297/391, 397, 410

[56] References Cited

U.S. PATENT DOCUMENTS

| | | | |
|---|---|---|---|
| 396,828 | 1/1889 | Moorman | 297/410 |
| 398,893 | 3/1889 | Gould | 297/410 |
| 1,781,600 | 3/1930 | Quisberg | 297/391 |
| 2,170,679 | 8/1939 | Dickerson | 248/412 X |
| 2,711,209 | 6/1955 | Riabovol | 248/412 |
| 2,849,249 | 8/1958 | Fridolph | 248/412 X |
| 3,578,384 | 5/1971 | Leichtl | 297/410 |
| 4,131,167 | 12/1978 | Richey | 403/109 |

FOREIGN PATENT DOCUMENTS

| | | |
|---|---|---|
| 2024115 | 8/1970 | France . |
| 2035354 | 12/1970 | France . |
| 2342688 | 9/1977 | France . |
| 2458422 | 1/1981 | France ............................ 297/410 |
| 636805 | 5/1950 | United Kingdom . |
| 883929 | 12/1961 | United Kingdom . |
| 999652 | 7/1965 | United Kingdom . |
| 1070298 | 1/1967 | United Kingdom . |
| 1167248 | 10/1969 | United Kingdom . |
| 1240955 | 7/1971 | United Kingdom . |
| 1435312 | 5/1976 | United Kingdom . |
| 2013485 | 8/1979 | United Kingdom . |
| 532330 | 10/1976 | U.S.S.R. ............................ 297/410 |

*Primary Examiner*—James T. McCall

[57] ABSTRACT

A supporting device (8) of a vehicle seat head rest (4) includes a retainer (6, 40) provided with a spring (10, 21, 44) which surrounds a supporting rod (5) of the head rest and resiliently engages therewith to support the head rest (4) at a desired height which can be adjusted in a stepless manner. The frictional retaining force of the spring can be released by an operating member (11, 20, 40) when the height of the head rest is to be adjusted. A cylindrical guide member (7, 41) serves to guide the adjusting movement of the supporting rod (5).

2 Claims, 11 Drawing Figures

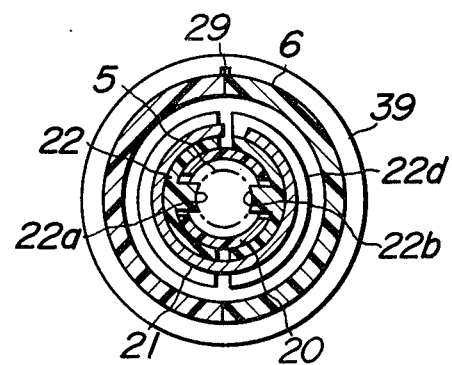
FIG_7
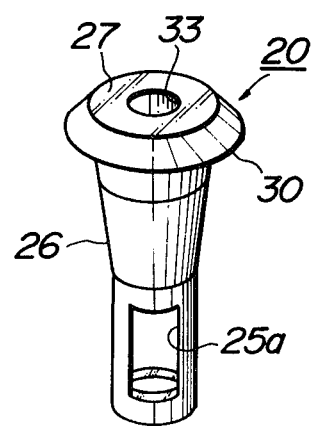
FIG_8

SUPPORTING DEVICE OF A HEAD REST FOR A VEHICLE SEAT

BACKGROUND OF THE INVENTION

1. Field of the Invention

The present invention relates to an improvement in a supporting device of a head rest for a vehicle seat, in which the head rest is vertically adjustably supported by a frame of the back portion of the seat.

2. Description of the Prior Art

Conventionally, in order to enable an adjustment of the height of the head rest, the head rest is provided with a pair of parallel supporting rods which are inserted into the seat back and retained at a desired adjusted height. To this end, a supporting device is known which includes a latch member selectively engageable with one of notches forming a row extending longitudinally of the supporting rod. With this arrangement, however, the head rest is lifted or lowered stepwisely only so that a fine adjustment to obtain an optimum driving position cannot be achieved. Another type of supporting device is also known by which a stepless fine adjustment of the head rest can be made. Such a supporting device includes a resilient member which is always in frictional contact with the supporting rod without notches. In this case, in order to adjust the height of the head rest, the head rest has to be lifted or lowered against the frictional force of the resilient member so that a substantial adjusting force is required.

SUMMARY OF THE INVENTION

Therefore, it is an object of the present invention to provide an improved head rest supporting device by which the height of the head rest can be adjusted in a stepless manner by a simple and easy operation which does not require a substantial operating force.

According to the present invention, there is provided a head rest supporting device of a vehicle seat, in which the head rest is provided with a supporting rod which is supported by a frame of a seat back of the seat such that the height of the supporting rod can be adjusted, comprising in combination:

a guide member secured to the frame of the seat back and having a longitudinally extending bore which guides a vertical adjusting movement of the supporting rod; and a retainer supported by the frame of the seat back and including a friction member which is resiliently urged against the outer surface of the supporting rod so as to vertically retain the head rest at a desired adjusted height, and an operating member which releases the friction member from the supporting rod permitting the adjusting movement of the supporting rod.

BRIEF DESCRIPTION OF THE DRAWINGS

FIG. 7 is a cross-sectional view taken along the line VII—VII of FIG. 5;

FIG. 8 is a perspective view of the operating member of the device shown in FIG. 5;

DETAILED DESCRIPTION OF THE PREFERRED EMBODIMENTS

Figure 1:
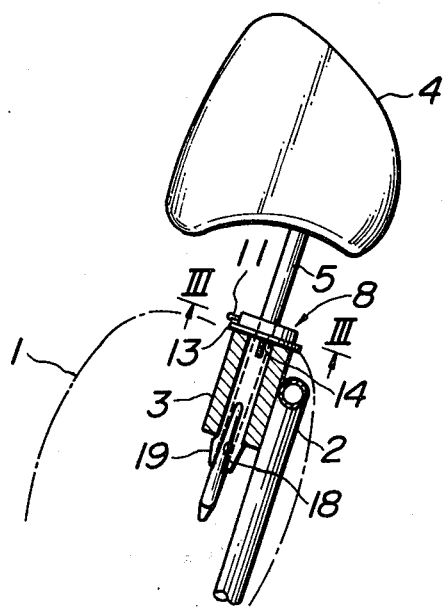
FIG. 1 is a side view, partly in section, of a head rest supporting device according to a first embodiment of the present invention.
Figure 2:
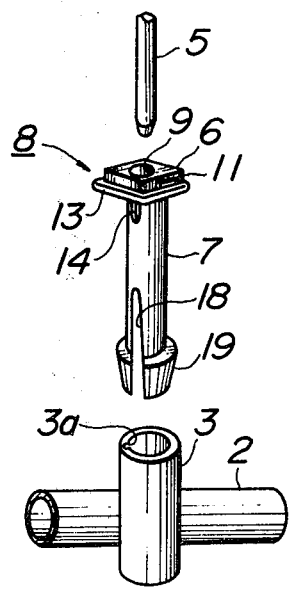
FIG. 2 is an exploded perspective view of the device shown in FIG. 1.

Referring now to FIGS. 1 to 4, there is shown a head rest supporting device according to the first embodiment of the present invention. A vehicle seat back 1 includes a frame 2 having a horizontally extending top portion to which a pair of cylindrical mounting members 3 are welded which are spaced from each other and extend substantially vertically. For the sake of simplicity, one of the mounting members 3 is omitted in the drawings. A head rest 4 is provided with a pair of vertically extending supporting rods 5. One of the supporting rods 5 which is not shown is freely slidably received in the corresponding mounting member 3. For the other supporting rod 5, a frictional retainer 6 and a cylindrical guide member 7 integrally molded from plastics material form the supporting device 8 which is mounted on the mounting member 3. More particularly, the retainer 6 is supported on the top end surface of the mounting member 3 while the guide member 7 extends through the mounting member 3. The supporting device 8 has a longitudinal bore 9 whose inner diameter is slightly greater than the outer diameter of the supporting rod 5 to permit an adjusting movement of the rod 5.

Figure 3:
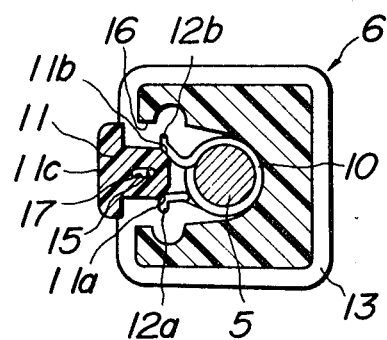
FIG. 3 is a cross-sectional view taken along the line III—III in FIG. 1.
Figure 4:
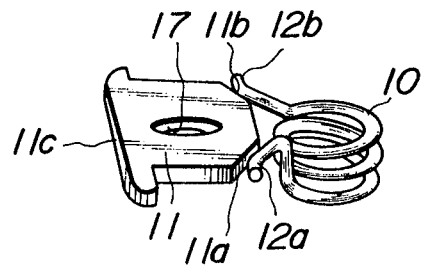
FIG. 4 is a perspective view showing the elements of the retainer for the device shown in FIG. 1.
Figure 5:
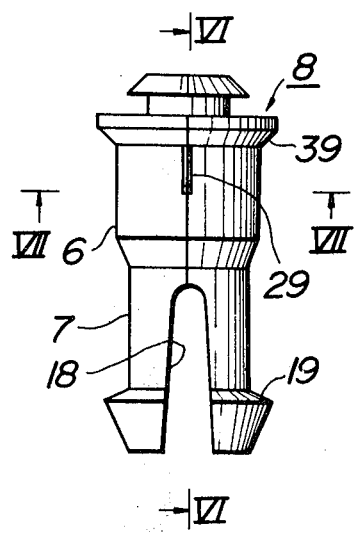
FIG. 5 is a side view of a head rest supporting device according to a second embodiment of the present invention.
Figure 6:
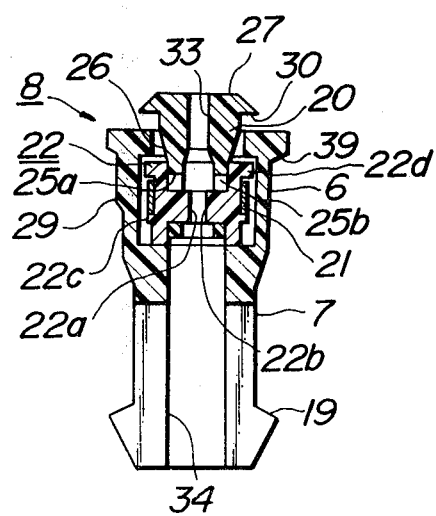
FIG. 6 is a longitudinal-sectional view taken along the line VI—VI of FIG. 5.

As shown in FIG. 3, the frictional retainer 6 includes a box-like housing which surrounds the supporting rod 5, and a flange 13 which closes a hole formed on the top surface of the seat back 2 to accommodate the device 8. The housing has an inner space 16 in the form of a slit which extends across the bore 9 and opens at one side surface of the housing. The retainer 6 further includes a coil spring 10 which is arranged in the inner space 16 such that both ends 12a, 12b extend toward the above-mentioned side surface of the housing. The spring 10 has an inner diameter which is slightly smaller than the outer diameter of the supporting rod 5, and is coaxial with the bore 9 to resiliently surround the rod 5. Preferably, the spring 10 has a flat inner surface which contacts the rod 5 to provide an increased contact area. The ends 12a, 12b of the spring 10 lie on a common horizontal plane and diverge from each other outwardly (FIG. 4).

The retainer 6 further includes an operating member 11 which is arranged partly in the inner space 16 of the housing. More particularly, the operating member 11 has an inner end in the form of inclined surfaces 11a, 11b which contact with the ends 12a, 12b of the spring 10, respectively, and an outer end 11c in the form of a push button projecting from the housing. The flange 13 on its upper surface is provided with a pin 15 projecting into the opening in the side surface of the housing. The pin 15 is received in a slot 17 which is formed in the operating member 11. By this, the operating member 11 biased outwardly by the spring 10 is prevented from escapement.

The upper end portion of the guide member 3 has on its outer surface a longitudinally extending ridge 14 which is received in a groove 3a formed on the inner surface of the cylindrical mounting member 3. By this, the supporting device 8 can be positively positioned in place, and prevented from rotation. The lower end portion of the guide member 3 has a plurality of longitudinally extending slits 18 and a shoulder 19 of larger outer diameter.

As the above-mentioned supporting device 8 is to be mounted on the seat back 1, the guide member 7 is forcedly inserted into the mounting member 3 until the ridge 14 is received in the groove 3a of the member 3 and the shoulder 19 contacts the lower end surface of the member 3. The slits 18 in the lower portion of the guide member 7 permits a sufficient deformation of the guide member 7 during this insertion. After the completion of this insertion, the axial movement of the guide member 7 is prevented by the flange 13 and the shoulder 19, while the rotation thereof is prevented by the ridge 14. Subsequently, the outer end 11c of the operating member 11 is pushed inwardly such that the inclined surfaces 11a and 11b cause the spring 10 to expand. In this condition, the supporting rod 5 is inserted into the bore 9 and passed through the spring 10. By releasing the operating member 11, the inner diameter of the spring decreases to frictionally retain the rod 5 at the desired height. In order to adjust the height of the head rest 4, the operating member 11 is pushed inwardly to expand the spring 10 so that the retaining force is not applied to the supporting rod 5 allowing a sliding movement of the rod 5. Since the operating member 11 is arranged on the upper surface of the seat back, the adjusting operation can be carried out very easily.

A second embodiment of the head rest supporting device according to the present invention is shown in FIGS. 5 to 8. The supporting device 8 including a retainer 6 and a guide member 7 consists of circumferentially divided two pieces made, for example, of plastics material. The top end of the retainer is formed as a flange 39 so that when the device 8 is mounted in position, the retainer 6 and the guide member 7 are arranged in the seat back while the flange 39 rests on the seat back to close the hole in the top surface of the seat back. The device 8 has a longitudinally extending central bore 34 whose inner diameter is greater than the outer diameter of the supporting rod 5 of the head rest.

The retainer 6 is a generally cylindrical member surrounding the supporting rod 5, and is provided on its outer surface with a longitudinally extending ridge 29 which engages with the groove 3a in the mounting member 3 (FIG. 2) to facilitate the positioning and prevent the rotation of the device 8. The retainer 6 is provided with a retaining mechanism which frictionally retains the head rest 4 at the desired height. The retaining mechanism includes three elements, i.e. an operating member 20, a cylindrical leaf spring 21 formed with a slit, and a friction member 22. The operating member 20 has a push button portion 27 provided with a flange 30 forming the upper end of the member 20, a tapered intermediate portion 26 and a lower portion which is formed with two diametrically opposite openings 25a, 25b having the axial length corresponding to the stroke of the push button portion 27. The operating member 20 is formed with a center bore 33 whose inner diameter is slightly greater than the outer diameter of the supporting rod 5. The friction member 22 consists of two semi-cylindrical parts which surround the lower portion of the operating member 20. The inner surfaces of the two parts are provided with projections 22a, 22b which engage with the openings 25a, 25b, respectively, and resiliently contact the supporting rod 5. To this end, the leaf spring 21 engages with the outer peripheral surface of the friction member 22 such that the projections 22a, 22b are biased inwardly. The friction member 22 has on its outer surface a stepped portion 22c which supports the leaf spring 21, and a flange 22d which engages with the lower surface of the flange 39. After the three elements 20, 21, 22 are assembled, this assembly is accommodated in the inner space of the retainer 6 such that the push button portion 27 is located above the flange 39. Then, the two pieces forming the device 8 are adhered to each other. The lower end of the friction member 22 has an outer diameter which is greater than the diameter of the bore 34. Further, the flange 22d has an outer diameter which is greater than the inner diameter of the flange 39. Thus, the friction member 22 is prevented from axial displacement. The operating member 20 is also axially retained by the friction member 22 as the openings 25a, 25b are in engagement with the projections 22a, 22b. As in the previous embodiment, the guide member 7 has slits 18 and a shoulder 19.

The supporting device 8 according to the second embodiment is mounted on the seat back frame in the same manner as in the first embodiment. In order to mount the head rest on the seat back, the push button portion 27 is pressed downwardly so that the tapered portion 26 causes the semi-cylindrical parts of the friction member 22 to expand against the force of the spring 21. Then, the supporting rod 5 of the head rest is inserted into the center bore 33 until a desired height is attained. The push button portion 27 is now released so that the spring 21 presses the semi-cylindrical parts of the friction member 22 inwardly to resiliently engage with the supporting rod 5. By this, the head rest 4 is frictionally supported at the desired height in a positive manner. In order to adjust the height of the head rest, the retaining frictional force is released by pressing the push button portion 27 so that the supporting rod 5 can be axially moved.

Figure 9:
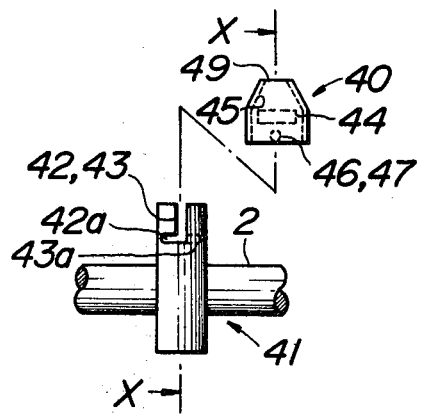
FIG. 9 is an exploded view of a head rest supporting device according to a third embodiment of the present invention.
Figures 10A, 10B:
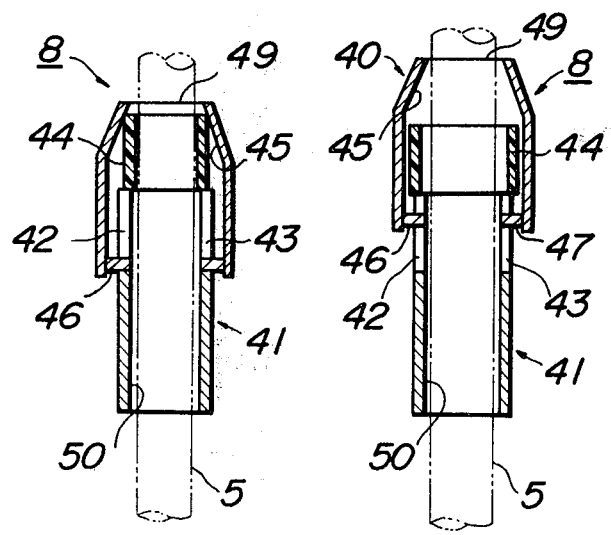
FIG. 10A is a longitudinal-sectional view taken along the line X—X in FIG. 9, showing the position in which the head rest is frictionally retained.
FIG. 10B is a view similar to FIG. 10A but showing the position in which the height of the head rest can be adjusted.

A third embodiment of the head rest supporting device according to the present invention is shown in FIGS. 9, 10A and 10B. The supporting device 8 includes a guide member 41 which is a vertically extending cylindrical member secured to the horizontal top portion of the seat back frame 2. The guide member 41 has a central bore 50 through which the supporting rod 5 extends, and a pair of substantially L-shaped slits 42, 43 which are arranged at the diametrically opposite sides of the top end portion of the member 41 and open at the top ends. A retainer 40, which serves as an operating member also, has an inner surface defining a bore 49, which includes a tapered upper portion 45 and a cylindrical lower portion. On the cylindrical inner surface portion, the retainer 40 is provided with a pair of pins 46, 47 which project radially inwardly to engage with the L-shaped slits 42, 43 of the guide member 41, respectively. The bore 49 in the retainer 40 accommodates a substantially cylindrical leaf spring 44 made of plastics material. The spring 44 has a longitudinally extending slit, not shown, and frictionally retains the supporting rod 5 of the head rest when it is compressed in the manner to be described hereinafter.

The supporting device 8 according to the third embodiment is assembled as follows. Firstly, the leaf spring 44 is compressed radially inwards so that its outer diameter is reduced below the distance between the inner ends of the pins 46, 47, and inserted into the bore 49 of the retainer 40. Then, the pins 46, 47 of the retainer 40 are aligned with the slits 42, 43 of the guide member 41, and the retainer 40 is pushed axially downwards. In this instance, the tapered inner surface portion 45 of the retainer 40 compresses the spring 44 radially inwards. As the pins 46, 47 reach the bottom end of the slits 42, 43, the retainer 40 is rotated by a predetermined angle with respect to the guide member 41 such that the pins 46, 47 engage with substantially horizontal portions 42a, 43a of the slits 42, 43, respectively. By this, the retainer 40 is axially retained by the guide member 41 with the spring 44 in the commmpressed condition.

In order to mount the head rest 4 in position, the pins 46, 47 are disengaged from the portions 42a, 43a of the slits 42, 43 by rotating the retainer 40 in the opposite direction. The retainer 40 can now be lifted upwardly causing the spring 44 to disengage from the tapered inner surface portion 45 thus permitting the expansion of the spring 44. In this condition, the supporting rod 5 is inserted into the bores 49, 50 such that it is loosely surrounded by the spring 44. Then, the retainer 40 is pressed down and rotated so that the pins 46, 47 engage with the horizontal portions 42a, 43a of the slits. Since the tapered inner surface portion 45 of the retainer 40 urges the spring 44 against the supporting rod 5, the rod 5 is frictionally retained at a desired height. In the case of adjusting the height of the head rest, the retaining frictional force of the spring 44 is released by lifting the retainer 40 in the manner mentioned above.

From the foregoing description, it will be appreciated that the present invention provides an improved head rest supporting device in which the supporting rod of the head rest is supported at a desired adjusted height by the resilient frictional force of a spring, and such a retaining force can be released when the height of the head rest is to be adjusted. This allows an easy adjusting operation without requiring a substantial operating force, and a stepless fine adjustment.

What is claimed is:

1. A head rest supporting device of a vehicle seat, in which the head rest is provided with a supporting rod which is supported by a frame of a seat back of the seat such that the height of the supporting rod can be adjusted, comprising in combination:
   a guide member secured to the frame of the seat back and having a longitudinally extending bore which guides a vertical adjusting movement of the supporting rod; and
   a retainer supported by the frame of the seat back and including a friction member which is resiliently urged against the outer surface of the supporting rod so as to vertically retain the head rest at a desired adjusted height, and an operating member which releases the friction member from the supporting rod permitting the adjusting movement of the supporting rod said friction member comprising a spring which surrounds the supporting rod in disengagement therefrom, and is compressed by the operating member radially inwardly to be frictionally engaged with the supporting rod, said operating member being adapted to maintain the spring in the compressed condition.

2. A head rest supporting device of a vehicle seat, in which the head rest is provided with a supporting rod which is in turn supported by a frame forming a seat back such that the height of the supporting rod can be adjusted, comprising in combination:
   a guide member secured to the frame of the seat back and having a longitudinally extending bore which guides the vertical adjustable movement of the supporting rod;
   a retainer supported by the frame of the seat back and including a friction member which is resiliently urged against the outer surface of the supporting rod so as to vertically retain the head rest at a desired adjusted height; and
   releasing means to disengage the friction member from the supporting rod thereby permitting adjustable movement of the supporting rod, said friction member comprising a spring which surrounds the supporting rod in frictional engagement therewith and is expandable radially outwardly to be disengaged from the supporting rod by pushing inwardly the releasing means.

* * * * *